United States Patent [19]

Dimanshteyn

[11] Patent Number: 4,612,239
[45] Date of Patent: Sep. 16, 1986

[54] ARTICLES FOR PROVIDING FIRE PROTECTION

[76] Inventor: Felix Dimanshteyn, 12 Sioux La., West Hartford, Conn. 06117

[21] Appl. No.: 608,728

[22] Filed: May 10, 1984

Related U.S. Application Data

[63] Continuation-in-part of Ser. No. 466,378, Feb. 15, 1983, abandoned.

[51] Int. Cl.⁴ .................. C09K 21/08; A62D 1/06; B27N 9/00
[52] U.S. Cl. .................. 428/246; 8/490; 156/326; 156/333; 169/DIG. 2; 252/4; 252/5; 252/7; 252/608; 428/251; 428/252; 428/285; 428/287; 428/920
[58] Field of Search .................. 252/2, 4, 5, 6, 7, 605, 252/608; 169/43, DIG. 2; 156/325, 326, 327, 333, 334; 428/920-921, 251, 252, 246, 284, 285, 287, 408, 902; 8/490

[56] References Cited

U.S. PATENT DOCUMENTS

| 639,674 | 12/1899 | Edwards | 252/4 |
|---|---|---|---|
| 1,271,506 | 7/1918 | Ferguson | 252/7 |
| 1,813,367 | 7/1931 | Thompson | 252/7 |
| 3,017,348 | 1/1962 | Steppe et al. | 252/7 |
| 3,238,129 | 3/1966 | Veltman | 252/7 |
| 3,317,433 | 5/1967 | Eichel | 252/7 |
| 3,714,047 | 1/1973 | Marion et al. | 252/4 |
| 3,826,764 | 7/1974 | Weber | 252/5 |
| 3,997,700 | 12/1976 | Jacquemin et al. | 428/920 |
| 4,184,311 | 1/1980 | Rood | 252/5 |
| 4,190,698 | 2/1980 | De Boel et al. | 428/920 |
| 4,504,991 | 3/1985 | Klancik | 428/285 |

FOREIGN PATENT DOCUMENTS 49-95494   9/1974   Japan .................. 252/4

Primary Examiner—Stephen J. Lechert, Jr.
Assistant Examiner—Howard J. Locker

[57] ABSTRACT

A fire protection and/or extinguishing article comprises a sheet which has, uniformly dispersed therein, a material which undergoes an endothermic reaction to release a non-flammable gas and simultaneously absorb heat when subjected to an elevated temperature. This sheet is sandwiched between a gas permeable thermal barrier and a layer of gas permeable thermal insulation in a preferred embodiment which may function as a foldable and storable blanket.

25 Claims, 1 Drawing Figure

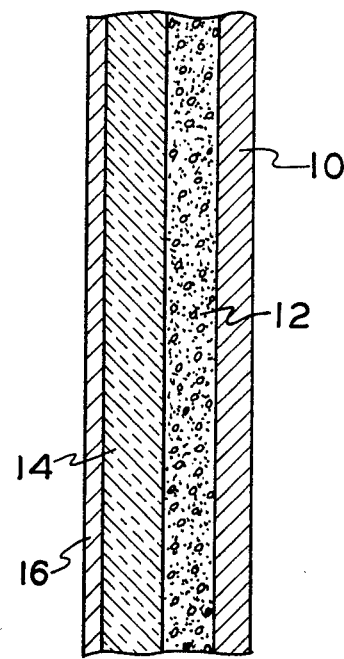

ARTICLES FOR PROVIDING FIRE PROTECTION

CROSS-REFERENCE TO RELATED APPLICATION

This application is a continuation-in-part of application Ser. No. 466,378 filed Feb. 15, 1983. (Abandoned)

BACKGROUND OF THE INVENTION

(1) Field of the Invention

The present invention relates to fire protection. More specifically, this invention is directed to devices and systems having an indefinite shelf life which, when subjected to an elevated temperature, will absorb heat and release a non-toxic, non-flammable gas. Accordingly, the general objects of the present invention are to provide novel and improved techniques and articles of such character and methods for the production of such articles.

(2) Description of the Prior Art

Flame retarding and/or extinguishing systems including chemicals, such as inorganic carbonates, which undergo an endothermic reaction to release non-toxic and non-flammable gases when subjected to elevated temperatures are known in the art. Exemplary of the prior art are the disclosures of U.S. Pat. Nos. 100,632, 639,674, 967,246, 1,813,367, 2,388,014, 3,238,129, 3,364,097, 3,714,047, 3,782,476, 3,826,764 and 4,184,311.

The prior art, as represented by the above-identified patents, has possessed one or more serious deficiencies which have limited the utility thereof. Thus, by way of example, the prior systems have had poor "shelf" life whereby their effectiveness in affording protection from and/or in the extinguishing of fire would degrade with time. At least some of the prior art systems, to remain effective, required periodic recharging and thus could not be counted upon to always be ready for use. Also, the prior techniques and systems have generally been characterized by high production cost. A further common deficiency of the prior art resides in the fact that products embodying the same have necessarily had very poor volumetric efficiency, for example have necessarily been rigid, and thus have been difficult and expensive to store. This lack of volumetric efficiency has also led to a lack of utilization in many situations.

SUMMARY OF THE INVENTION

The present invention overcomes the above-briefly discussed and other deficiencies and disadvantages of the prior art by providing a novel fire protection and/or extinguishing system and particularly a multilayer "solid" fire safety device which may be flexible or rigid. A system in accordance with the invention is always ready for use, never needs recharging and is easy to store. A system in accordance with the present invention, when exposed to an elevated temperature, absorbs a significant amount of heat and simultaneously generates a non-toxic, non-flammable gas. Depending on the mode of use of the system, the generated gas may be employed to define a gaseous thermal barrier and/or to deprive a fire of oxygen.

A fire protection and/or extinguishing system in accordance with the invention employs an extinguishing/coolant agent characterized by the ability to decompose when subjected to an elevated temperature and, during decomposition, to absorb a significant amount of heat while generating non-toxic, non-flammable gases. Further, after decomposition this extinguisher/coolant agent will in part define a flame barrier having a high melting point. The selected extinguisher/coolant agent, in a product in accordance with the preferred embodiment of the invention, will be uniformly dispersed throughout a layer or sheet. In order to form this layer, the extinguisher/coolant agent in granular form is blended with an adhesive which is characterized by being non-flammable, non-toxic and by curing at room temperature or at a slightly elevated temperature. The mixed and cured adhesive and extinguisher/coolant agent define a non-porous member which, continuing to discuss the preferred embodiment, will be flexible and thus capable of being folded without tearing for storage.

In accordance with a first embodiment the adhesive and extinguisher/coolant agent are directly mixed. In accordance with a second embodiment the agent in powder form is microencapsulated prior to being mixed with the adhesive. The adhesive may have a melting temperature which is above the temperature at which the extinguisher/coolant agent decomposes. In this case, the extinguisher/coolant agent will decompose in the same volume which it occupies in the product. Accordingly, as the gas is generated high pressures are produced. When the pressure exceeds that which the adhesive or adhesive plus microcapsules can contain, microexplosions will occur and the gas will escape. Articles in accordance with the invention may have the ability to extinguish a fire in close proximity thereto since the gas is non-flammable and will deprive the fire of oxygen.

In accordance with the preferred embodiments, the layer including the extinguishing/coolant agent is sandwiched between a thermal barrier material and a layer of thermal insulation.

BRIEF DESCRIPTION OF THE DRAWING

The present invention may be better understood and its numerous advantages will become apparent to those skilled in the art by reference to the accompanying drawing which is a cross-sectional view of a portion of a fire protection blanket in accordance with a preferred embodiment of the invention.

DESCRIPTION OF THE PREFERRED EMBODIMENTS

A protection system in accordance with the present invention employs an extinguisher/coolant agent which will decompose when subjected to an abnormal, i.e., an elevated, temperature. The extinguisher/coolant agent, upon decomposition, will produce a comparatively large quantity of a non-toxic, non-flammable gas, and in doing so, absorbs a significant amount of heat.

The present invention may, for example, take advantage of any of the following endothermic reactions:

(1)

$$2NaHCO_3 \rightleftharpoons Na_2CO_3 + H_2O + CO_2$$

$$Na_2CO_3 \rightleftharpoons Na_2O + CO_2$$

or (2)

$$2KHCO_3 \rightleftharpoons K_2CO_3 + H_2O + CO_2$$

$$K_2CO_3 \rightleftharpoons K_2O + CO_2$$

Additional extinguisher/coolant agents which may be employed include borax ($Na_2B_4O_7 \cdot 10H_2O$), monoammonium phosphate and urea-potassium bicarbonate.

The extinguishing/coolant agents mentioned above are, in accordance with the preferred modes of practice of the invention, are obtained in or reduced to powder form and mixed with a suitable adhesive to produce a composite in sheet form. The powdered extinguishing-/coolant agent is uniformly distributed throughout the composite. The adhesive employed is selected such that in its liquid state it may be mixed with the extinguishing-/coolant agent in powder form at a temperature below the decomposition temperature of the extinguishing-/coolant agent. The adhesive is also selected such that it will cure at room temperature, or at an elevated temperature which is well below the decomposition temperature of the extinguishing/coolant agent. The adhesive will also be non-flammable, non-toxic and have a high melting point after curing. The adhesive may be chosen so as to have a melting point which is above the decomposition temperature of the extinguishing/coolant agent. Suitable adhesives include polyvinyl alcohol, neoprene elastomers, latex modified esastomer emulsions and synthetic elastomers.

In one reduction to practice of the present invention the adhesive, in its liquid state, and the powdered extinguishing/coolant agent are mixed at room temperature. The adhesive is subsequently allowed to cure, also preferably at room temperature, whereby a non-porous sheet, i.e., a solid fire extinguisher, is formed. This sheet comprises the extinguishing/coolant agent in powder form "encapsulated" in, i.e., supported by, the adhesive.

As an alternative, the extinguishing/coolant agent and adhesive may be mixed, the mixture allowed to cure to form a solid and the solid then granulated to form a microencapsulated extinguishing/coolant agent. In this case the adhesive will be chosen to have a melting point which is above the decomposition temperature of the extinguishing/coolant. The microencapsulated agent may subsequently be used as described below, for example it may be mixed with a second adhesive. The following examples demonstrate the fabrication of sheet material in accordance with the present invention:

(1) Extinguishing/coolant agent $NaHCO_3$ = 70 to 75 percent by volume

Adhesive: Latex modified elastomer emulsion, Type LA-6541, Borden Chemical Co. = 30 to 25 percent by volume Adhesive and $NaHCO_3$ in powder form (average gain size in the range of 15–75 microns) were mixed at room temperature and allowed to cure to form a flexible sheet 1/16 inches thick.

(2) Same as Example (1) except the powder/adhesive mixture was spread over a fiberglass or metal screen supported on a base. The sheets were flexible and had a thickness in the range of 3/32 to 1/16 inches.

(3) Extinguishing/coolant agent: $NaHCO_3$

Adhesive: Neoprene elastomer, Type FN-421, Franklin Chemical Co.

$NaHCO_3$ in powder form (average particle size 15–25 microns)

The extinguishing/coolant agent was mixed with an aqueous solution of sodium silicate ($Na_2SiO_3$) in the ratio of between 85 and 90 percent $NaHCO_3$ to between 15 and 10 percent $Na_2SiO_3$ by volume. This resulted in the bicarbonate powder being microencapsulated in water glass, i.e., microcapsules containing the powder were formed. The microencapsulated bicarbonate powder was then mixed with the adhesive at room temperature in the ratio of between 70 and 75 percent encapsulated powder to between 30 and 25 percent adhesive by volume. After curing at room temperature, a flexible sheet having a thickness of 3/32 inches was available for use.

(4) Same as Example (3) except reinforcing screen employed as in Example (2).

(5) Same as Examples 1 and 2 except a neoprene elastomer adhesive was employed in an amount of 30% to 25% by volume in place of the latex modified elastomer emulsion. The neoprene adhesive was type FN-421 available from Franklin Chemical Co. or Stabond Co. Type N-122 or N-134.

(6) Same as Examples 1, 3 and 5 except between 10 and 15 percent by volume of fiberglass filler added to the mixture of adhesive/extinguishing agent. The filler provides additional thermal insulation and, in part, is selected for its insulating properties.

A sheet in accordance with the above-described embodiments of the present invention is believed to function as a fire protection/extinguishing product in the following manner. When a surface of the sheet is heated above the decomposition temperature of the extinguishing/coolant agent a reaction occurs whereby a non-flammable gas is generated and a significant amount of heat is absorbed. Initially the decomposition will occur in a layer adjacent to the heated surface and the decomposition of this layer will cool the next layer. Also, the gases which are generated will themselves function as a barrier to the penetration of heat through the sheet. Since the agent will decompose in the same volume which it occupied before being microencapsulated and/or captured in the adhesive if the melting temperature of the adhesive is greater than the decomposition temperature of the agent, the pressure will become sufficiently great to result in microexplosions whereby the gas will escape leaving behind material having a high melting point. Thus, the material comprising the decomposed layer of the sheet functions secondarily as a barrier to fire. The above-discussed process will proceed through the sheet layer-by-layer.

With reference now to the drawing, a preferred embodiment of the present invention is depicted in cross-section, it being understood that the drawing is not to scale. The preferred embodiment is in the form of a flexible protective blanket which may, for example, be folded and stored in bedrooms, hotel rooms, etc. and used, perhaps in combination with a gas-mask, to protect individuals as they exit a burning building. In this form the invention generally comprises a thermal barrier 10, an intermediate layer 12 containing the extinguishing/coolant agent and a layer of insulating material 14.

The thermal barrier layer 10 will be comprised of a material which will not melt or otherwise suffer a degradation in its physical characteristics at temperatures below 1000° F. and preferably below temperatures of up to 3100° F. or higher. Thermal barrier 10 will be gas permeable in the preferred embodiment and may, for example, be comprised of woven fiberglass, graphite fiber, ceramic fibers or silica textile. In an alternative embodiment, which is not depicted in the drawing, barrier layer 10 may be impermeable to gas. Suitable non-porous thermal barrier layers 10 may be comprised of or include a film, fabricated from materials such as "Teflon", or "Kapton", or a foil, fabricated from materials such as aluminum, stainless steel or brass.

The intermediate layer 12 will include, as described above, a material which decomposes when exposed to elevated temperatures so as to release a non-toxic, non-flammable gas and, in so doing, to absorb heat. This decomposable material will be uniformly dispersed in layer 12.

The insulation layer 14, which in use is placed closest to the object or individual to be protected, is non-flammable and will not release any toxic fumes when heated. Layer 14 may be comprised of any suitable non-flammable, gas permeable flexible thermal insulation material such as fiberglass. Layer 14 may, if necessary or desirable, be provided with a protective cover 16 on the outwardly disposed side thereof. The cover 16, if present, will provide physical isolation between the insulating material and the body of an individual using the blanket. Cover 16 may be comprised of a fabric material which can withstand temperatures of up to 1000° F. or higher without degrading.

A blanket as shown in the drawing may be assembled using various techniques. The non-porous intermediate layer 12 may be formed as described above in Example (1)–(6). The three layers of a laminate-blanket may be assembled employing a non-flammable adhesive. Alternatively, the blended adhesive/agent (see again Examples 1, 3, 5 and 6) in paste form may be calendered onto either or both of the thermal barrier material 10 or insulation layer 14, the layers stacked and the laminate then cured.

The functioning of a protective blanket in accordance with the present invention is as follows. When barrier layer 10 is exposed to a elevated temperature heat will ultimately be transferred therethrough to the decomposable material comprising layer 12. This material will, in the manner described above, decompose layer-by-layer and, in so doing, will absorb heat and generate inert gas. When layer 10 is gas permeable, the thus generated gas creates a gas barrier adjacent the outer surface of the blanket which tends to further insulate the user of the blanket from the heat. The insulation layer 14 provides the user additional isolation from the heat source. It is to be noted that the drawing depicts the present invention in its least complicated form. It is possible to form a blanket including additional layers. For example, a five layer blanket would comprise an additional layer 12, including the decomposable extinguishing/coolant agent, and an additional sheet of either barrier 10 or insulation 14.

Specific examples of flexible blankets in accordance with the present invention are as follows:

EXAMPLE 8.

Thermal barrier 10—a fiberglass fabric having a thickness of 7 mils, a yarn size of 225 and a plain weave, (Hexcel Company, Style 128 for example).

Intermediate layer 12=see Example (1) above. 70–75% by volume $NaHCO_3$ and 30–25% by volume latex modified elastomer emulsion (Borden Chemical Co. Type LA-6541). $NaHCO_3$ and adhesive mixed at room temperature and allowed to cure to provide a flexible sheet.

Insulation layer 14—fiberglass ("Aeroflex" Type 200 produced by Ownings/Corning Fiberglass Co.)

Laminate bonded together by same adhesive as employed in layer 12.

EXAMPLE 9.

Thermal barrier 10=a graphite fabric having a thickness of 7.2 mils, 12.5×12.5 construction and a plain weave, (Hexcel Company, Style F3T282 for example).

Intermediate layer 12=70–75% by volume $KHCO_3$ and 30%–25% by volume neoprene elastomer adhesive (Franklin Chemical Co. Type FN-421). $KHCO_3$ and adhesive mixed at room temperature and allowed to cure.

Insulation layer 14=fiberglass ("Aerocor" Type PF-3360 produced by Ownings/Corning)=¼ inches thick.

Laminate bonded together as in Example 8.

EXAMPLE 10.

Thermal barrier 10—"Kevlar" twill fabric having a thickness of 0.026 inches (Gentex Company, Style 1090, for example).

Intermediate layer 12=see Example (8) above.
Insulation layer 14=omitted
Laminate bonded together as in Example (8).

EXAMPLE 11.

Thermal barrier 10=a ceramic fabric having a thickness of 9 mils—(Hexel Co-Style XC568 "Satin Weave" for example)

Intermediate layer 12=see Example (9) above.
Insulation layer 14=fiberglass insulation material.
Laminate bonded together as in Example (8).

EXAMPLE 12.

Thermal barrier 10=a 4 mil thick "Teflon" film.
Intermediate layer 12 70–75% by volume of $NaHCO_3$ and 30–25% by volume of neoprene elastomer adhesive (Franklin Chemical Co. Type FN-421). The adhesive and $NaHCO_3$ were mixed at room temperature and allowed to cure.

Insulation layer 14=fiberglass insulation material.
The layers were bonded together as in Example (8).

EXAMPLE 13.

Thermal barrier 10=a 0.7 mil thick aluminum foil.
Intermediate layer 12=as set forth in Example (12) above except that the adhesive was Stabond Corp. Type N-122. The $NaHCO_3$ and adhesive were mixed at room temperature and allowed to cure to provide a flexible sheet.

Insulation layer 14=fiberglass.
The layers were bonded as in Example (8).

EXAMPLE 14.

Thermal barrier 14=a fiberglass insulation material.
Intermediate layer 12=70–75% by volume $NaHCO_3$ and 30–25% by volume polyvinyl alcohol adhesive (Air Products Co. Type V-540).

Insulation layer 14=fiberglass cloth.
The layers were bonded together using the polyvinyl alcohol adhesive.

In the embodiments of Examples 12 and 13 the thermal barrier layer 10 is a film or foil which is impermeable to the gas generated upon decomposition of the extinguisher/coolant agent. In such embodiments the lamination procedure must allow for partial outward expansion of layer 10, for example by corrugation of layers 10. In use the generated gas will cool the inwardly facing side of layer 10 and will form a gaseous thermal barrier between layer 10 and the unreacted part of layer 12.

It is to be understood that the invention is not limited to the embodiments described and shown herein, which are deemed to be merely illustrative of the best modes of carrying out the invention, and which are susceptible to modification as to form, composition and details of operation. The invention rather is intended to encompass all such modifications which are within its spirit and scope as defined by the claims.

What is claimed is:

1. A fire protection article comprising:
an extinguishing/coolant agent, said agent comprising a dry material which is stable at room temperature and which will undergo an endothermic reaction to generate a non-toxic and non-flammable gas while simultaneously absorbing heat when subjected to an elevated temperature, said extinguishing/coolant agent being selected from the group consisting of sodium bicarbonate, potassium bicarbonate, borax, monoammonium phosphate and urea potassium bicarbonate;
a non-flammable and non-toxic adhesive, said adhesive and agent being intimately mixed and cured to define a non-porous layer having the agent uniformily dispersed therein, said adhesive being selected from the group consisting of neoprene elastomer, latex modified elastomer emulsions, synthetic elastomers and polyvinyl alcohol; and
a thermal barrier layer, said barrier layer being comprised of a gas permeable fabric and being at least partly bonded to a first surface of said non-porous layer, said fabric being non-flammable and retaining its dimensional stability at temperatures above the temperature at which said agent undergoes an endothermic reaction, said fabric being comprised of fibers selected from the group consisting of glass, graphite and ceramic.

2. The article of claim 1 further comprising:
a layer of thermal insulating material bonded to the second surface of said non-porous layer.

3. The article of claim 2 further comprising:
an isolation layer bonded to the exposed surface of said layer of thermal insulating material.

4. The article of claim 2 wherein said layer of thermal insulating material is gas permeable.

5. The article of claim 1 wherein the adhesive has a melting temperature which is higher than the temperature at which the agent decomposes and the agent undergoes the endothermic reaction in the same volume it occupies in the non-porous layer whereby high localized gas pressures result, the gas being micro-explosively released from the non-porous layer when the containment pressure of the adhesive is exceeded.

6. The article of claim 5 wherein said micro-explosions initially occur in a layer of the non-porous layer adjacent the surface which is closet to the heat source and proceed internally in generally a layer-by-layer process.

7. The article of claim 6 wherein said agent is micro-encapsulated prior to the formation of said non-porous layer.

8. The article of claim 7 wherein said microcapsules comprise water glass.

9. The article of claim 4 further comprising:
an isolation layer bonded to the exposed surface of said layer of thermal insulating material.

10. The article of claim 1 wherein said agent is micro-encapsulated prior to the formation of said non-porous layer.

11. The article of claim 10 wherein the adhesive has a melting temperature which is higher than the temperature at which the agent decomposes and the agent undergoes the endothermic reaction in the same volume it occupies in the layer whereby high localized gas pressures result, the gas being micro-explosively released.

12. The article of claim 10 further comprising:
a layer of thermal insulating material bonded to the second surface of the said non-porous layer.

13. A fire protection article comprising:
an extinguishing/coolant agent, said agent comprising a dry material which is stable at room temperature and which will undergo an endothermic reaction to generate a non-toxic and non-flammable gas while simultaneously absorbing heat when subjected to an elevated temperature, said agent being selected from the group consisting of sodium bicarbonate, potassium bicarbonate, borax, monoammonium phosphate and urea potassium bicarbonate;
a non-flammable and non-toxic adhesive; said adhesive and agent being intimately mixed and cured to define a non-porous layer having the agent uniformly dispersed therein, said adhesive being selected from the group consisting of neoprene elastomer, laxtex modified elastomer emulsions, synthetic elastomers and polyvinyl alcohol; and
a thermal barrier layer, said barrier layer being at least partly bonded to a first surface of non-porous layer, said barrier layer being non-flammable and non-permeable to the generated gas, said barrier layer being comprised of a material selected from the group consisting of metal and plastic and retaining its physical and chemical properties at temperatures exceeding the temperature at which the agent undergoes an endothermic reaction to generate gas.

14. The article of claim 13 wherein said barrier layer can in part expand outwardly relative to said non-porous layer.

15. The article of claim 13 further comprising:
a layer of gas permeable thermal insulating material bonded to the second surface of said non-porous layer.

16. The article of claim 13 wherein the adhesive has a melting temperature which is higher than the temperature at which the agent decomposes and the agent undergoes the endothermic reaction in the same volume it occupies in the non-porous layer whereby high localized gas pressures result, the gas being micro-explosively released from the non-porous layer when the containment pressure of the adhesive is exceeded.

17. The article of claim 16 wherein said micro-explosions initially occur in a layer of the non-porous layer adjacent the surface which is closest to the heat source and proceed internally in generally a layer-by-layer process.

18. The article of claim 15 further comprising:
an isolation layer bonded to the exposed surface of said layer of thermal insulating material.

19. The article of claim 18 wherein said isolation layer is gas permeable.

20. The article of claim 13 wherein said barrier layer is comprised of a foil selected from the group consisting of aluminum, steel and brass.

21. The article of claim 14 wherein said barrier layer is comprised of foil selected from the group consisting of aluminum, steel and brass.

22. The article of claim 15 where said barrier layer can in part expand outwardly relative to said non-porous layer.

23. The article of claim 16 further comprising:
a layer of insulating material bonded to the second surface of said non-porous layer.

24. The article of claim 13 wherein said agent is microencapsulated prior to the formation of said non-porous layer.

25. The article of claim 24 wherein the adhesive has a melting temperature which is higher than the temperature at which the agent decomposes and the agent undergoes the endothermic reaction in the same volume it occupies in the layer whereby high localized gas pressures result, the gas being micro-explosively released.

* * * * *